United States Patent [19]

Kraemling et al.

[11] Patent Number: 4,556,600

[45] Date of Patent: Dec. 3, 1985

[54] LAMINATED GLASSES USING A NON-THERMOPLASTIC ADHESIVE INSERT LAYER

[75] Inventors: Franz Kraemling, Aachen; Achim Müller, Herzogenrath; Ludwig Linden; Helmer Raedisch, both of Aachen, all of Fed. Rep. of Germany

[73] Assignee: Saint Gobain Vitrage, Courbevoie, France

[21] Appl. No.: 429,057

[22] Filed: Sep. 30, 1982

Related U.S. Application Data

[63] Continuation of Ser. No. 182,114, Aug. 28, 1980, abandoned.

[30] Foreign Application Priority Data

Sep. 3, 1979 [FR] France ............................... 79 22014

[51] Int. Cl.$^4$ ..................... B32B 27/40; B32B 17/10; B32B 31/20
[52] U.S. Cl. ................................. 428/216; 428/412; 428/425.6; 428/437; 428/430; 428/911; 428/913; 528/49
[58] Field of Search ................................. 428/911, 913

[56] References Cited

U.S. PATENT DOCUMENTS

| | | | |
|---|---|---|---|
| 3,509,015 | 4/1970 | Wismer et al. | 428/425.6 |
| 3,791,914 | 2/1974 | Ammons et al. | 428/425.6 |
| 3,878,036 | 4/1975 | Chang | 428/425.6 |
| 4,139,674 | 2/1979 | Muller et al. | 428/425.6 |
| 4,169,181 | 9/1979 | Molari, Jr. | 428/425.6 |

FOREIGN PATENT DOCUMENTS

| | | |
|---|---|---|
| 2629779 | 1/1978 | Fed. Rep. of Germany . |
| 2061451 | 6/1971 | France . |
| 2148515 | 3/1973 | France . |
| 2153037 | 4/1973 | France . |

*Primary Examiner*—Patricia C. Ives
*Attorney, Agent, or Firm*—Pennie & Edmonds

[57] ABSTRACT

A plastic adhesive layer used as an insert layer in laminated glasses and the laminated glasses containing the insert layer, the adhesive layer comprising a polyfunctional polyol component and a polyfunctional isocyanate component, wherein the polyol component is present in considerable excess and the numerical ratio of the isocyanate groups to the hydroxyl groups is between 0.2 and 0.6. The adhesive layer is particularly useful in soundproofing glasses and in safety glasses such as bulletproofing glasses.

14 Claims, No Drawings

LAMINATED GLASSES USING A NON-THERMOPLASTIC ADHESIVE INSERT LAYER

This is a continuation of application Ser. No. 182,114, filed Aug. 28, 1980, now abandoned.

FIELD OF THE INVENTION

The present invention relates to a novel plastic adhesive layer used as an insert in laminated glasses and to the resulting laminated glasses containing the insert layer.

BACKGROUND OF THE INVENTION

A great variety of adhesive insert layers are known for use in laminated glasses. For example, polyvinylbutyral, polyurethanes and other polymers or copolymers, such as copolymers of vinyl acetate, are used.

Generally, the choice of insert layer depends on the type of laminated glass and its use. Thus, in glasses for automobiles and buildings, polyvinylbutyral is essentially used as the insert, which gives the glass safety properties and determined mechanical properties. For glasses comprising glass-polycarbonate assemblies, the use of a polyurethane base adhesive is known and described in the publication of German patent application DE AS No. 15 94 164. Finally, for soundproofing glasses, the use of a vinyl acetate copolymer as the insert is known according to German patent application DE AS No. 17 09 322.

Although known insert layers exhibit certain interesting properties for well-defined applications, they are unsatisfactory in many regards because of their limited applications and also because of their specific manner of application.

German patent application DE AS No. 15 94 164 discloses the use of a partially polymerized sheet having thermoplastic properties and formed from a thermoplastic polyurethane containing an excess of isocyanate groups. However, the resulting adhesive exhibits a certain sensitivity to temperature. In particular, the elasticity of the adhesive diminishes and then cannot absorb entirely the shearing stresses resulting from the difference in the glass and polycarbonate expansion factors, thus causing deformations of the assembly. Furthermore, the ability of the adhesive to hold small pieces of glass in case of a break leaves much to be desired. Also, stoichiometric mixtures of the isocyanate and polyol components, and especially mixtures containing an excess of the isocyanate component, are relatively expensive.

Similar unsatisfactory properties are also exhibited by the insert layer disclosed in the German patent application DE AS No. 17 09 322, which describes a soundproofing laminated glass comprising a 6 mm glass plate bonded on another sheet of glass or polycarbonate by a layer of adhesive formed from a vinyl acetate copolymer having high viscoelastic properties. Once again, the resulting adhesive exhibits a certain sensitivity to temperature, with a reduction in the elasticity of the adhesive at low temperature. Also, the adhesion is insufficient to hold small pieces of glass in case of breaking of the glass.

One of the objects of the present invention is to provide an insert layer that can be used in laminated glasses with very diverse applications. The insert layer for laminated glasses according to the present invention exhibits adhesion properties that are not affected by great temperature variations and, in case of breaking of the glass, it holds the glass pieces. Also, the insert layer according to the present invention can adequately absorb the shearing stresses due to the differences in expansion rates of the glass laminate components such as, for example, glass and polycarbonate. Another object of the present invention is to provide a laminated glass having excellent soundproofing properties at low manufacturing costs.

SUMMARY OF THE INVENTION

In accordance with the present invention, a plastic adhesive layer for use as an insert layer in laminated glasses is formed from a mixture of a polyfunctional polyol component and a polyfunctional isocyanate component, with the polyol component being used in considerable excess and with the numerical ratio of the isocyanate groups to the hydroxyl groups being between about 0.2 and 0.6.

DETAILED DESCRIPTION OF THE INVENTION

The plastic adhesive insert layer of the present invention is formed from a castable mixture of a polyol component and an isocyanate component. The polyol component is used in considerable excess and the numerical ratio of the isocyanate groups to the hydroxyl groups in the mixture is between about 0.2 and 0.6.

The reaction product after in situ polymerization is not a polyurethane in the proper sense of the word because of the large excess of the hydroxyl group component in the mixture, but rather is a polyol containing polyurethane groups. This reaction product is not a thermoplastic product and it exhibits a set of properties which, for many uses, make it superior to known adhesives, particularly for forming laminated glasses. Among these advantageous properties are the following: a better adhesion to the surface of a silicate glass because of the excess hydroxyl groups; a slight viscoelasticity so that the stresses produced are more easily absorbed; a greater independence of the elastic properties with regard to temperature; a good aptitude of the mixture to be poured; a great ability of holding even very small pieces of glass after breaking of the glass; a good acoustic insulation resulting from the great loss of viscoelastic energy inside the adhesive insert layer; and fabrication of the adhesive insert layer at low cost.

Preferably, in order to form the adhesive insert layer of the present invention, a mixture is used in which the numerical ratio of the isocyanate groups to the hydroxyl groups is between about 0.25 and 0.45. This gives a finished product having a degree of crosslinking between about 25 and 45%.

In the mixture from which the adhesive insert layer of the present invention is formed, it is particularly advantageous to use as the polyfunctional polyol component one or more polyesterpolyols or polyetherpolyols, which have a molecular weight between about 250 and 4000 and are obtained by the reaction of water or a polyfunctional alcohol, such as ethyleneglycol, 1,4-butanol, glycerin, trimethylolpropane, hexanetriol, pentaerythritol, sorbitol, etc., with aliphatic dicarboxylic acids, such as adipic acid or cyclic acids such as ethylene oxide, propylene oxide or tetrahydrofuran. As the polyfuntional isocyanate component, polyfunctional isocyanates are used such as hexamethylenediisocyanate, trimethylhexamethylenediisocyanate, m- xylylenediisocyanate, 4,4'-methylenebis · (cyclohexylisocyanate), isophoronediisocyanate or their biuret with three or more isocyanate functions.

According to the present invention, the adhesive insert layer is preferably applied in a thickness of at least 0.5 mm and up to 12 mm between the sheets to be bonded. It is advantageous if the thickness of the insert layer is greater than 1 mm.

Also, the adhesive insert layer can be made in situ by pouring the adhesive on the surface of the glass to be bonded. It is not necessary to make a separate sheet from the adhesive mixture and then place it between two sheets for assembly by calendering.

With regard to the novel features of the adhesive insert layer of the present invention, it is particularly advantageous when the Shore Hardness is less than 20, and preferably less than 10.

The applicants' tests have shown that the soundproofing qualities of a laminated glass having a slightly crosslinked polyurethane adhesive insert layer according to the present invention are much better than those of a similar glass having a polyvinylbutyral insert layer.

The following examples illustrate the present invention without, however, limiting it.

EXAMPLE I

The following are mixed under low pressure to avoid formation of air bubbles: 1850 g of a polyetherpolyol obtained by condensation of 1,2-propyleneoxide with 2,2-bis (hydroxy-1-butanol), having a molecular weight around 450 and a free hydroxyl radical content of about 11.5% (e.g., the product sold under the name DESMOPHEN 550 U by the Bayer AG Company); 0.19 g of dibutyltin dilaurate; and 716 g of a 1,6-hexamethylenediisocyanate biuret having a free isocyanate radical content of about 22% (e.g., the product sold under the name DESMODUR N/100 by the Bayer AG Company).

The resulting mass, which is easily poured, is cast in a 4 mm layer on a sheet of glass 8 mm thick. A sheet of glass 4 mm thick is placed on the adhesive layer. The adhesive is cured at a temperature of 313 k (40° C.) for 3½ hours before the layer can be removed from its horizontal position. After complete curing, the adhesive exhibits a numerical ratio of isocyanate groups to hydroxyl groups of about 0.3. The Shore Hardness is less than 10 and the elastic and plastic deformations of the adhesive layer remain unchanged in the interesting temperature range going from 256 K. to 353 K. (−15° C. to 80° C.). For the resulting laminated glass, a soundproofing of 38 dB ($R_W$) was measured by the DIN 52210 method.

By way of comparison, a laminated glass of indentical structure, but using a soundproofing insert layer in which the numerical ratio of the isocyanate groups to the polyol groups corresponds to an 80% degree of cross-linking, has a soundproofing $R_W$ of only 35 dB. This shows that an increase in the crosslinking of the adhesive notably reduces the soundproofing properties.

EXAMPLE II

A mass suitable for casting, prepared according to Example I, is poured on a glass sheet 3 mm thick and placed horizontally to form a 2 mm thick layer. Then a polycarbonate plate 5 mm thick is placed on the layer of adhesive and a 2 mm thick layer of adhesive is again applied. Finally, a 3 mm thick sheet of silicate glass is placed on this second layer of adhesive. The adhesive is then cured at a temperature of 313 K. (40° C.) for 3½ hours before the layer can be moved from its horizontal position. After complete curing, the layer shows a numerical ratio of the isocyanate groups to the hydroxyl groups of about 0.3 and a Shore Hardness less than 10. The Shore Hardness and elastic and plastic deformations of the adhesive layer are unchanged in the interesting temperature range going from 258 K. to 353 K. (−15° C. to 80° C.).

A laminated glass having the foregoing structure lends itself extremely well to use as a shatterproof glass. Repeated impact tests with the point of a hammer having a mass of 8 kg show that it cannot go through the laminated glass. On the impact side, the pieces of glass are embedded in the adhesive insert layer that holds the slivers, even the smallest ones.

EXAMPLE III

The following are mixed under low pressure to avoid formation of air bubbles: 73.9 g of a polyetherpolyol obtained by condensation of 1,2-propylene oxide with 2,2-bis (hydroxymethyl-1-butanol), having a molecular weight of about 450 and a free hydroxyl radical content of about 11.5% (e.g., the product sold under the name DESMOPHEN 550 U by the Bayer AG Company); 0.074 g of dibutyltin dilaurate; and 25.3 g of isophoronediisocyanate having a freee isocyanate radical content of about 37.5% (e.g., the product IPDI of the Veba-Chemie Company).

The foregoing mixture exhibits a numerical ratio of isocyanate groups to hydroxyl groups of about 0.45 and a degree of crosslinking of about 45% after polymerization.

The mixture is placed between two sheets of glass at ambient temperature and then cured at a temperature of about 313 K. (40° C.). The resulting laminated glass shows soundproofing properties comparable to those of the laminated glass of Example I.

EXAMPLE IV

A reaction mixture is prepared as described in Example I. The mixture is placed at ambient temperature between a sheet of glass and a sheet of polycarbonate, and then cured at a temperature of about 313 K. (40° C.). The adhesive shows properties comparable to those of the adhesive described in Example III.

EXAMPLE V

The following are mixed under low pressure to avoid formation of air bubbles: 422.6 g of polytetramethylene ether diol having a molecular weight of about 650 and a free hydroxyl radical content of about 5.3% (e.g., the product sold under the name TERACOL 650 by the Du Pont Company); 0.274 g of dibutyltin dilaurate; and 125 g of 1,6-hexanediisocyanate biuret having a free isocyanate radical content of about 23.2% (e.g., the product sold under the name DESMODUR L 2291 by the Bayer AG Company).

In the resulting mixture, the numerical ratio of the isocyanate groups to the hydroxyl groups is about 0.52 and the degree of reticulation of the glue, after curing, is about 50%.

The mixture is then placed between a glass sheet and a polycarbonate sheet in the form of a layer 2 mm thick. The adhesive is completely cured in about 60 minutes at a temperature of 40° C.

EXAMPLE VI

The following are mixed under low pressure to avoid formation of air bubbles: 261 g of a polyether obtained by condensation of 1,2,3-trihydroxypropane and 1,2-propylene oxide, having a molecular weight of about 450 and a free hydroxyl radical content of about 12% (e.g., the product sold under the name NAPTER G 130 by the Naphta-Chimie Company); 0.026 g of dibutyltin dilaurate; and 100 g of 1,6-hexanediisocyanate biuret having a free isocyanate radical content of about 23.2% (e.g., the product sold under the name DESMODUR L 2291 by the Bayer AG Company).

The numerical ratio of the isocyanate groups to the hydroxyl groups in the mixture is about 0.3, which, after curing, results in an adhesive with a degree of crosslinking of about 30%. The mixture is then placed between two glass sheets. The resulting laminated glass shows good soundproofing properties.

EXAMPLE VII

A mixture is prepared as described in Example VI and a glass-polycarbonate assembly is made as set forth in the preceding examples.

EXAMPLE VIII

A glass is made according to Example I, except that there is placed on a glass sheet 8 mm thick a layer of adhesive 2 mm thick having about a 30% degree of polyurethane crosslinking. The adhesive layer is then covered with a polycarbonate layer 5 mm thick on which is next placed a second layer of adhesive having a crosslinking degree of about 30%, which, finally, is covered with a glass sheet 4 mm thick.

Curing of the adhesive layers is done as in Example I. The resulting laminated glass exhibits a soundproofing of $R_W = 40$ dB. Use of polycarbonate layer in the laminated glass achieves several advantages. For example, it reduces the weight of the glass, it makes possible a reduction of the thickness of the glass, and it increases the resistance to breaking.

This laminated glass can be used as a shatterproof glass.

EXAMPLE IX

The following are mixed under low pressure to avoid formation of air bubbles: 280 g of polypropylene glycol having a molecular weight of around 425 and a free hydroxyl radical content of about 7.9% (e.g., the product marketed under the name of PPG 425 by the Union Carbide Company); 0.159 g of dibutyltin dilaurate; and 117 g. of a 1,6-hexanediisocyanate biuret having a free isocyanate radical content of about 22.2% (e.g., the product marketed under the name DESMODUR N/100 by the Bayer AG Company).

The resulting mixture exhibits a numerical ratio of isocyanate groups to hydroxyl groups of about 0.48 and the degree of reticulation of the adhesive after curing is about 48%.

The mixture is then placed between two sheets of glass. The resulting laminated glass exhibits good soundproofing properties.

EXAMPLE X

A mixture is prepared as described in Example IX and a glass-polycarbonate assembly is made as set forth in the preceding examples.

EXAMPLE XI

A polytetramethylene ether diol sold under the name of TERACOL 650 by the Du Pont Company is mixed under low pressure to avoid the formation of air bubbles with a 1,6-hexanediisocyanate biuret sold under the name of DESMODUR L 2291 by the Bayer Company in the presence of 0.05% dibutyltin dilaurate by weight in relation to the total weight of the mixture. In the resulting mixture, the numerical ratio of the isocyanate groups to the hydroxyl groups is about 0.52.

The mixture is then placed between two sheets of glass. The resulting laminated glass exhibits good soundproofing properties.

EXAMPLE XII

A mixture is prepared as described in Example XI and a glass-polycarbonate assembly is made as set forth in the preceding examples.

EXAMPLE XIII

This example demonstrates the preparation of a bulletproof glass which on the side opposite the firing exhibits a protective layer from slivers and which avoids the releasing of these slivers. In this regard, a standard armored glass is used made up of a glass 3 mm thick, a polyvinyl butyral layer 1.5 mm thick, and a glass 8 mm thick. A layer of adhesive 2 mm thick, prepared according to the preceding examples, is placed on this latter glass layer, followed by a 2 mm thick plate of polycarbonate.

If necessary, this polycarbonate plate can be covered on its free face with a layer having self-healing properties to scoring as described in German patent DE AS No. 26 29 779 and DE OS No. 27 29 229.

EXAMPLE XIV

A soundproofing glass is made by using two laminated glasses, each formed of two glass sheets 3 mm thick and a layer of polyvinyl butyral 0.76 mm thick. These two laminated glasses are then bonded together with a layer of adhesive 2 mm thick prepared according to one of the preceding examples.

EXAMPLE XV

A mixture is prepared as described in one of the preceding examples. A first laminated glass is made by placing a 2 mm thick layer of the resulting adhesive mixture on a glass sheet 6 mm thick, followed by another glass sheet 4 mm thick. A second laminated glass is made from two glass sheets 4 mm thick bonded together by a 2 mm thick layer of the adhesive.

These two laminated glasses are then combined with a frame to form an insulating window having a space of 15 to 24 mm between the two laminated glasses. These windows have an extremely high soundproofing RW of 50 to 52 dB.

Other embodiments of laminated glasses using the insert layer according to the present invention can be used to make other types of laminated glasses, particularly glass-cellulose acetate butyrate assemblies.

We claim:

1. A laminated glass having a non-thermoplastic adhesive insert layer comprsing a polyfunctional polyol component and a polyfunctional isocyanate component, wherein the polyol component is present in considerable excess and the numerical ratio of the isocyanate groups to the hydroxyl groups is between about 0.25 and 0.45.

2. A laminated glass according to claim 1 wherein the thickness of the adhesive insert layer is at least about 0.5 mm.

3. A laminated glass according to claim 1 wherein the thickness of the adhesive insert layer is greater than about 1 mm.

4. A laminated glass according to claim 1 wherein the adhesive insert layer exhibits a Shore Hardness of less than about 20.

5. A laminated glass according to claim 1 wherein the adhesive insert layer exhibits a Shore Hardness of less than about 10.

6. A safety glass comprising a glass sheet and a polycarbonate sheet bonded by an adhesive insert layer comprising a polyfunctional polyol component and a polyfunctional isocyanate component, wherein the polyol component is present in considerable excess and the numerical ratio of the isocyanate groups to the hydroxyl groups is between about 0.25 and 0.45, the adhesive insert layer having a thickness of at least about 1.5 mm and a Shore Hardness of less than about 20.

7. A safety glass according to claim 6 wherein the numerical ratio of the isocyanate groups to the hydroxyl groups in the adhesive insert layer is between about 0.25 and 0.45 and the adhesive insert layer has a thickness of at least about 2 mm and a Shore Hardness of less than about 10.

8. A bulletproof safety glass according to claim 6 wherein a glass sheet of about 8 mm in thickness and a polycarbonate sheet of about 2 mm in thickness are bonded by an adhesive insert layer of about 2 mm in thickness, further comprising a glass sheet of about 3 mm in thickness bonded to the glass sheet of about 8 mm in thickness by a polyvinyl butyral insert layer of about 1.5 mm in thickness.

9. A soundproofing glass comprising at least a glass layer and a transparent plastic adhesive layer having high viscoelastic properties comprising a polyfunctional polyol component and a polyfunctional isocyanate component, wherein the polyol component is present in considerable excess and the numerical ratio of the isocyanate groups to the hydroxyl groups is between about 0.25 and 0.45, the adhesive layer having a thickness of at least about 1 mm.

10. A soundproofing glass according to claim 9 wherein the adhesive layer has a thickness between about 0.5 mm and 12 mm.

11. A soundproofing glass according to claim 9 wherein the adhesive layer bonds two glass sheets.

12. A soundproofing glass according to claim 9 wherein two of the adhesive layers bond two glass sheets to a polycarbonate sheet.

13. A sound proofing glass according to claim 9 wherein two of the adhesive layers bond two polycarbonate sheets to a glass sheet.

14. A soundproofing glass according to claim 9 wherein the adhesive layer bonds two laminated glasses, each comprising two glass sheets bonded by a polyvinyl butyral adhesive insert layer.

* * * * *